US006188714B1

(12) United States Patent
Yamaguchi

(10) Patent No.: US 6,188,714 B1
(45) Date of Patent: Feb. 13, 2001

(54) PARALLEL M-SEQUENCE GENERATOR CIRCUIT

(75) Inventor: Hirohisa Yamaguchi, Tsukuba (JP)

(73) Assignee: Texas Instruments Incorporated, Dallas, TX (US)

(*) Notice: Under 35 U.S.C. 154(b), the term of this patent shall be extended for 0 days.

(21) Appl. No.: 09/222,026

(22) Filed: Dec. 29, 1998

(51) Int. Cl.[7] .............................. A61F 2/06; H04L 27/30
(52) U.S. Cl. ..................... 375/130; 375/142; 708/252
(58) Field of Search .................... 375/130, 142, 375/150, 343, 377; 708/252, 250; 380/50

(56) References Cited

U.S. PATENT DOCUMENTS

| 3,946,215 | 3/1976 | May ................................. 235/152 |
|---|---|---|
| 4,493,046 | 1/1985 | Watanabe ........................ 364/717 |
| 4,837,790 | 6/1989 | Harada ............................ 377/33 |
| 4,939,745 | 7/1990 | Kirimoto et al. ................. 375/1 |
| 4,959,832 | 9/1990 | Bardell, Jr. ...................... 371/27 |
| 4,984,247 * | 1/1991 | Kaufmann et al. .............. 375/130 |
| 5,046,036 | 9/1991 | Tezuka ............................. 364/717 |
| 5,136,611 | 8/1992 | Kirimoto et al. ................. 375/1 |
| 5,157,689 | 10/1992 | Kurihara ........................... 375/1 |
| 5,745,522 * | 4/1998 | Heegard . |
| 5,844,925 * | 12/1998 | Dent . |
| 6,014,446 * | 1/2000 | Finkelstein ....................... 380/46 |
| 6,055,265 * | 4/2000 | Kim ................................. 375/150 |

OTHER PUBLICATIONS

"A Class of Balanced Binary Sequences with Optimal Autocorrelation Properties," Lempel et al., IEEE Transactions On Information Theory, vol. IT–23, No. 1, Jan. 1977, pp. 38–42.

"An Introduction to Linear Recursive Sequences in Spread Spectrum Systems," Richard Schwarz, SIGTEK Inc.

"Optimum Multiuser Detection Is Tractable for Synchronous CDMA Systems Using M–Sequences," Ulukus et al., IEEE Communications Letters, vol. 2, No. 4, Apr. 1998, pp. 89–91.

* cited by examiner

Primary Examiner—Chi H. Pham
Assistant Examiner—Jean B. Corrielus
(74) Attorney, Agent, or Firm—April M. Mosby; W. James Brady; Frederick J. Telecky, Jr.

(57) ABSTRACT

A parallel M-sequence generator is disclosed which outputs an identical bit stream of a serial M-sequence generator of equal chip length. In a parallel N-bit implementation, the first N bits of the sequence are read at the output, the remaining bits are shifted, and the new N bits are generated, all in one clock cycle. The effect of obtaining N bits at the output is to multiply the present contents of the shift register by a companion matrix of the Nth order. Linear combining elements (e.g. XOR gates) are selectively positioned to combine the contents of various delay elements of the parallel structure and feedback the results to other delay elements in order to produce the identical output of the serial structure.

21 Claims, 6 Drawing Sheets

$$I = \begin{bmatrix} 0100000000000000000000000000000000000000 \\ 0010000000000000000000000000000000000000 \\ 0001000000000000000000000000000000000000 \\ \\ 0000000000000000000000000000000000000001 \\ 1001000000000000000000000000000000000000 \end{bmatrix}$$

*FIG. 6A*

$$I^8 = \begin{bmatrix} 0000000010000000000000000000000000000000 \\ 0000000001000000000000000000000000000000 \\ \\ 0000000000000000000000000000000000000001 \\ 1001000000000000000000000000000000000000 \\ 0100100000000000000000000000000000000000 \\ \\ 0000000010010000000000000000000000000000 \end{bmatrix}$$

*FIG. 6B*

$$I^{16} = \begin{bmatrix} 0000000000000000100000000000000000000000 \\ 0000000000000000010000000000000000000000 \\ \\ 0000000000000000000000000000000000000001 \\ 1001000000000000000000000000000000000000 \\ \\ 0000000000000000100100000000000000000000 \end{bmatrix}$$

*FIG. 6C*

PARALLEL M-SEQUENCE GENERATOR CIRCUIT

BACKGROUND OF THE INVENTION

The newest wave of technology to hit telecommunications is that which is behind personal communications systems (PCS). A number of PCS architectures have emerged in recent years to meet the increasing demands for mobile and personal portable communications. One architecture that seems to offer the most relief from overcrowding in the airwaves is Code Division Multiple Access (CDMA), also known as "spread spectrum." CDMA systems can offer up to twenty times more call-handling capacity than the conventional cellular systems by assigning a special electronic code to each call signal, allowing more calls to occupy the same space and be spread over an entire frequency band. Spread spectrum communication technology has been in use by the military for over half a century, primarily to overcome jamming and to protect the signal from eavesdropping. In the commercial realm, spread spectrum digital technology has achieved a much higher bandwidth efficiency for a given wireless spectrum allocation, and hence serves a far larger population of multiple access users than analog or other digital technologies.

CDMA works by combing each phone call with a code which only one cellular phone can extract from the air waves. It operates by spreading all signals across the same broad frequency spectrum and assigning a unique code to each signal. Therefore, many mobile units can be transmitting over the same frequency and at the same time. The dispersed signals are pulled out of the background noise by a receiver associated with the code. Each receiver will determine which signal is addressed to it by checking the code assigned. The receiver must also be "smart" enough to analyze a captured signal, despread the signal, and identify which signal should be reconstituted.

The spreading of the signal at the transmitter is accomplished by means of a code which is independent of the data. Direct Sequence is one of the best known spread spectrum techniques. Using Direct Sequence, the digital signal is multiplied by a pseudo-random noise code (PN-code) which exhibits properties similar to true Gaussian noise. This results in low cross-correlation values among the various coded signals used in the frequency spectrum and hence, the more difficult it is to jam the signal or to detect a data message using the code. (Cross-correlation can be described as the comparison of two sequences to see how similar they are to one another at different phases.) Several families of binary PN-codes exist, but the usual way to create a PN-code is relatively simple, in that a number of shift registers is all that is required. Another observation is that the despread operation at the receiver is the same as the spread operation at the transmitter. In the receiver, the received signal is multiplied again by the same (synchronized) PN-code. Since the code consists of +1's and −1's (or perhaps 0's and 1's) this operation completely removes the code from the signal by cancellation, and the original data signal is left intact.

A common PN-code sequence is a maximal length ("long bit") sequence, or M-sequence. Much use is made of M-sequences in digital wireless communication. Some practical M-sequences having lengths as short as 11 bits or as long as $2^{89}-1$ or longer, have been employed for PN-code generation purposes, at code rates from under a bit per second to over several hundred megabits per second. In a practical CDMA application, it is often required to start M-sequences at an arbitrary value (phase of the code). One approach for this implementation is to obtain the corresponding initial register values to start the code generation. The initial register value is defined by a seed register value and the phase of the generated code. The seed value is usually found by reading special information transmitted from the base station of the cellular phone. The phase of the code is used to protect the security of user information to be transmitted over the wireless channel, and is individually defined for each hand-held terminal (handset). When the handset is activated, it needs to synchronize its code to the base station code. However, since the base station code is being continuously shifted, synchronizing the phone with the base station poses a difficult design consideration. First, the handset circuitry determines how much time its code lags or advances the base station code. It then either calculates the register value (this part is not easily done when the register size is long) with the phase difference between the base station and handset correctly adjusted, or if the phase difference is small, advances the output code by shifting the register by the required number of clocks. However, the calculation approach is not practical when the phase difference is small, since it can be much easier and faster to shift the seed register value than to execute complex computations to derive the seed register value mathematically. In practice, an arbitrary phase position can be obtained by preparing a number of representative code seed values and shifting the set register by the remainder clock counts. For this purpose, the shift register needs to be clocked at high speed to minimize the phase adjustment time, the time to lock on to the incoming signal. This operation increases the power consumption of the code generator, and is not favorable for mobile communication equipment requiring low power. Furthermore, there is a fundamental limit in the clock speed. Therefore, a code generator having simultaneous low power, high-speed capability is desired.

SUMMARY OF THE INVENTION

The present invention disclosed and claimed herein comprises a method for generating a maximal length sequence of data. An initial sequence of shift registers is first defined. A logic network is then provided which is operable to perform predetermined logic operations between select inputs thereto and select outputs therefrom. Various outputs from the shift registers are selectively input to the logic network to be operated thereon by the logic network. The results output from the logic network are then input to select ones of the shift registers. The contents of the shift registers are shifted in such a manner that the contents of at least two adjacent shift registers in the sequence of shift registers is shifted to an adjacent two of the shift registers in a single shift operation of the shift registers shifting the sequence therethrough.

In another aspect of the present invention, the shift registers are arranged in blocks of shift registers with each of the blocks having a length of N. The blocks are connected in a parallel configuration in an order from an input block to an output block, wherein each of the outputs of the shift registers in a preceding one of the blocks is input to the inputs of corresponding ones of the shift registers in the adjacent one of the blocks, with the last of blocks providing an N-bit output word. The logic network is operable to interconnect the outputs of select ones of the shift registers in the blocks to inputs of select ones of the shift registers with the predetermined logic function performed thereon. This interconnection operation is performed in accordance with a maximal length sequence algorithm, this algorithm requiring an initial sequence of data to be stored in the blocks of shift registers. Once the initial sequence is stored, it is shifted through the blocks of shift registers in N-bit increments to realize a maximal length sequence defined by the algorithm.

BRIEF DESCRIPTION OF THE DRAWINGS

For a more complete understanding of the present invention and the advantages thereof, reference is now made to the following description taken in conjunction with the accompanying Drawings in which:

FIG. 6 illustrates a set of matrices which are used in the code generation process.

DETAILED DESCRIPTION OF THE INVENTION

Uniformly distributed PN-code sequences using linear feedback shift-register (LFSR) structures are gaining attention for application in digital wireless communications since they are easier to phase lock (i.e., to lock-on to a signal). In the general design of LFSRs, feedback arrangements are desirable to produce the maximum number of distinct binary outputs. Shift-register sequences having the maximum number of distinct binary outputs are called maximal-length sequences or M-sequences. The M-sequence is perhaps the most common PN-coded sequence and is a binary sequence generated by a LFSR. The number of distinct sequences generated by an LFSR with r stages (or delay elements) is $2^r-1$, if the LFSR has a "primitive" characteristic polynomial. Such primitive polynomials have no roots which comprise the set of binary numbers 0 and 1 (are irreducible or non-factorable) and operate under modulo-2 addition and logical AND multiplication. An M-sequence generator produces a sequence whose repeat length (or period) is $2^r-1$, and whose register fills contained all possible fill values, except the all-zero fill, after $2^r-1$ clocks. Additionally, a selection of every $n^{th}$ bit of such a sequence is called a decimation of the sequence. Such selections are obtained by applying a single shift register with a number of specially selected feedback taps. The number of possible codes is dependent on the number of possible sets of feedback taps that produce the M-sequence. If n is prime relative to $2^r-1$, then a proper decimation occurs. A property of M-sequences is that if each n is carefully selected, then proper decimation of an M-sequence is also an M-sequence. For example, in a 4-stage LFSR, there are 15 possible binary sequences ($2^4-1=5$). The prime factors being 3 and 5, decimation by either 3 or 5 would be improper. However, 7 is acceptable, since it is prime relative to 15.

Figure 1:
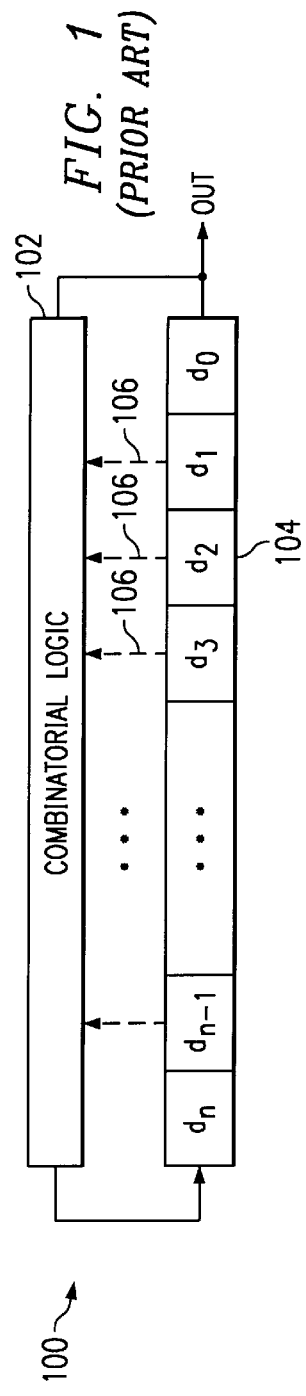
FIG. 1 illustrates a general parallel M-sequence structure.

Referring now to FIG. 1, there is illustrated a conventional n-stage M-sequence structure 100. The structure 100 comprises a number of delay elements 104 (designated $d_0$, $d_1$, . . . ,$d_n$) connected such that each successive delay element input is connected to the previous delay element's output, and all delay element clock inputs are connected to a single clock source so that when a clock pulse is sent, the contents of each delay element 104 is shifted into the next delay element 104 (e.g., $d_3$ into $d_2$, $d_2$ into $d_1$, etc.). The contents of delay element $d_0$ is shifted to the output OUT, and are also fed into combinatorial logic 102. The combinatorial logic 102 may comprise a number of linear combining elements (e.g., exclusive-OR (XOR gates) used to provide modulo-2 addition of selected stage outputs 106 along the series of delay elements 104. The large number of code sequences in an M-sequence are obtained by selectively tapping the delay elements 104, and combining the contents of various delay elements 104 using the combinatorial logic 102, the result of which is fed back to the input delay element $d_n$.

Figure 2:
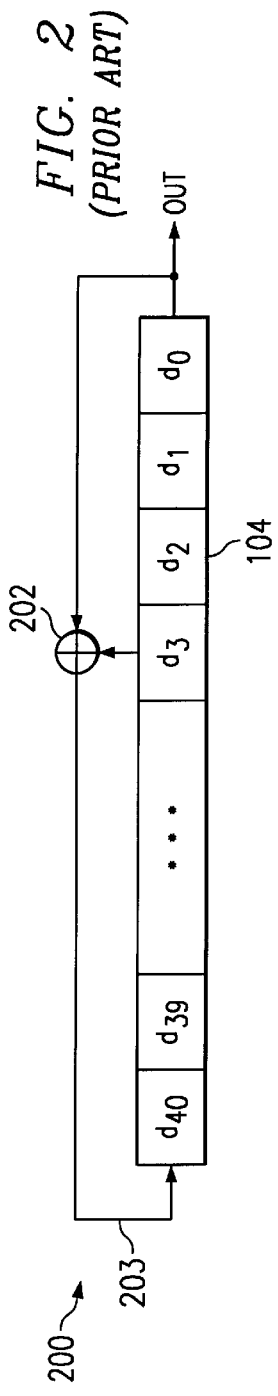
FIG. 2 illustrates a prior art serial M-sequence structure.

Referring now to FIG. 2, there is illustrated a prior art 41-stage serial M-sequence generator, appropriately referred to as a LFSR 200. The LFSR 200 comprises a number of delay elements 104 (e.g., D-type flip-flops), and a linear combining element 202 (e.g., an exclusive-OR (or XOR) circuit). The delay elements 104, denoted $d_0$, $d_1$, . . . ,$d_{40}$, store logical values having either a 0 or 1. The delay elements 104 are connected such that each successive delay element input is connected to the previous delay element's output, and all delay element clock inputs are connected to a single clock source such that when a clock pulse is sent, the contents of each delay element is shifted into the next delay element. The logical values contained in each delay element 104 are transferred to the succeeding delay element 104 every one clock cycle in a left-to-right direction (e.g., $d_3$ to $d_2$, $d_2$ to $d_1$, etc.). The logical values of the delay elements $d_0$, $d_1$, . . . ,$d_{40}$ are sequentially outputted to exterior circuitry for processing through output port OUT. The linear combining element 202 performs the XOR operation of the logical values contained in delay element $d_3$ and the current value present in delay element $d_0$ (which is also at the output port OUT). The resultant value on a line 203 is then fed back to the input of delay element $d_{40}$ (also the input of the sequence generator). The XOR logical operation is defined as shown Table 1.

TABLE 1

XOR logical operation.

| Input | | Output |
|---|---|---|
| 0 | 0 | 0 |
| 0 | 1 | 1 |
| 1 | 0 | 1 |
| 1 | 1 | 0 |

The M-sequence is the maximum period among the sequences created from the LFSR 200. In the shift register of FIG. 2, the delay elements 104 are arranged in 41 stages, but can generally be arranged in any number of stages. Additionally, as mentioned hereinabove, it is necessary to satisfy some primitive limited combination of the feedback tap positions (e.g., $d_3$ in this illustration) in order to obtain the M-sequence using the LFSR 200. The period P of the M-sequence created by the LFSR 200 is given by the following expression, $P=2^r-1$, where r=number of delay elements 104 of the shift register 200. Thus a 41-stage shift register with a feedback tap at delay element $d_3$ has a characteristic equation of $X^{41}+X^3+1$, where the first parameter, $X^{41}$, indicates the most significant stage (delay element $d_{40}$) of the M-sequence, the $X^0=1$ parameter is the least significant position (or delay element $d_0$), and the $X^3$ parameter is the tap stage (delay element $d_3$).

Figure 3:
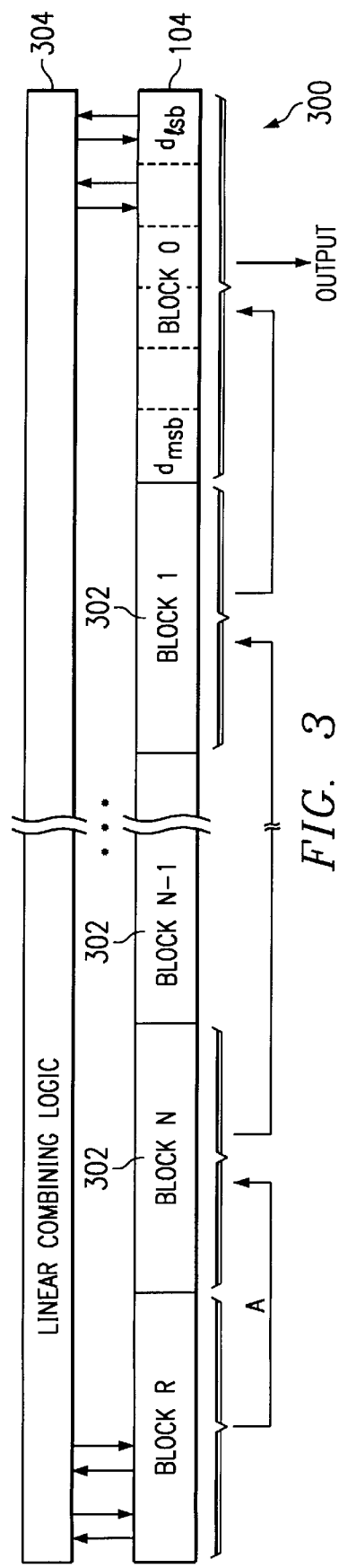
FIG. 3 illustrates a conventional 41-stage M-sequence generator using a serial shift register.

Referring now to FIG. 3, there is illustrated a general parallel M-sequence structure 300, according to a preferred embodiment. The parallel structure may be created by simply slicing the serial sequence structure 100 of delay elements 104, of FIG. 1, into blocks 304 (Block 0,1, . . . ,N) of the desired output word length. For example, if the output of the generator is to be eight bits wide, each of Blocks 0,1, . . . , N consists of eight delay elements 104. Similarly, if the generator had a 16-bit wide output, each of the blocks (Block 0,1, . . . , N) would contain sixteen delay elements 104. If the total number of delay elements 104 divided by the output length produces a remainder, Block R comprises the remainder number of delay elements 104. The remaining Block R will have less than the desired output word length of delay elements 104. Each word (or block 302) comprises a number of delay elements 104 designated $d_{lsb}$ to $d_{msb}$, wherein $d_{lsb}$ is the least significant bit position, and $d_{msb}$ is the most significant bit position. The input/output connections of each delay element 104 of the serial sequence structure 100, of FIG. 1, are then redirected to obtain the parallel structure of FIG. 3. For example, for those blocks 302 which have a full output word complement of delay elements 104 (Blocks 0,1, . . . ,N), the outputs of the delay elements 104 of Block N are connected to respective inputs of the delay elements of the succeeding Block N-1, the outputs of the delay elements 104 of Block N-1 are connected to the respective inputs of the succeeding block 302 delay elements 104, etc. More specifically, each bit position of the respective blocks 104 are connected in series. For example, the least-significant-bit position delay elements $d_{lsb}$ of Block N, Block N-1, . . ., Block 0 are connected in series, the most-significant-bit position delay elements $d_{msb}$ of Block N, Block N-1, . . . ,Block 0 are connected in series, and all other intermediate delay elements 104 are connected in series with their respective delay element 104 positions of the previous block 302. The contents of each of the delay elements 104 of Block 0 not only provide the output OUTPUT of the parallel generator 300, but are also combined with the contents of selected delay elements 104 using linear combining logic 304, the result of which is fed back to the inputs of delay elements 104 in Block R and the inputs of selected delay elements 104 of Block N.

Figure 4:
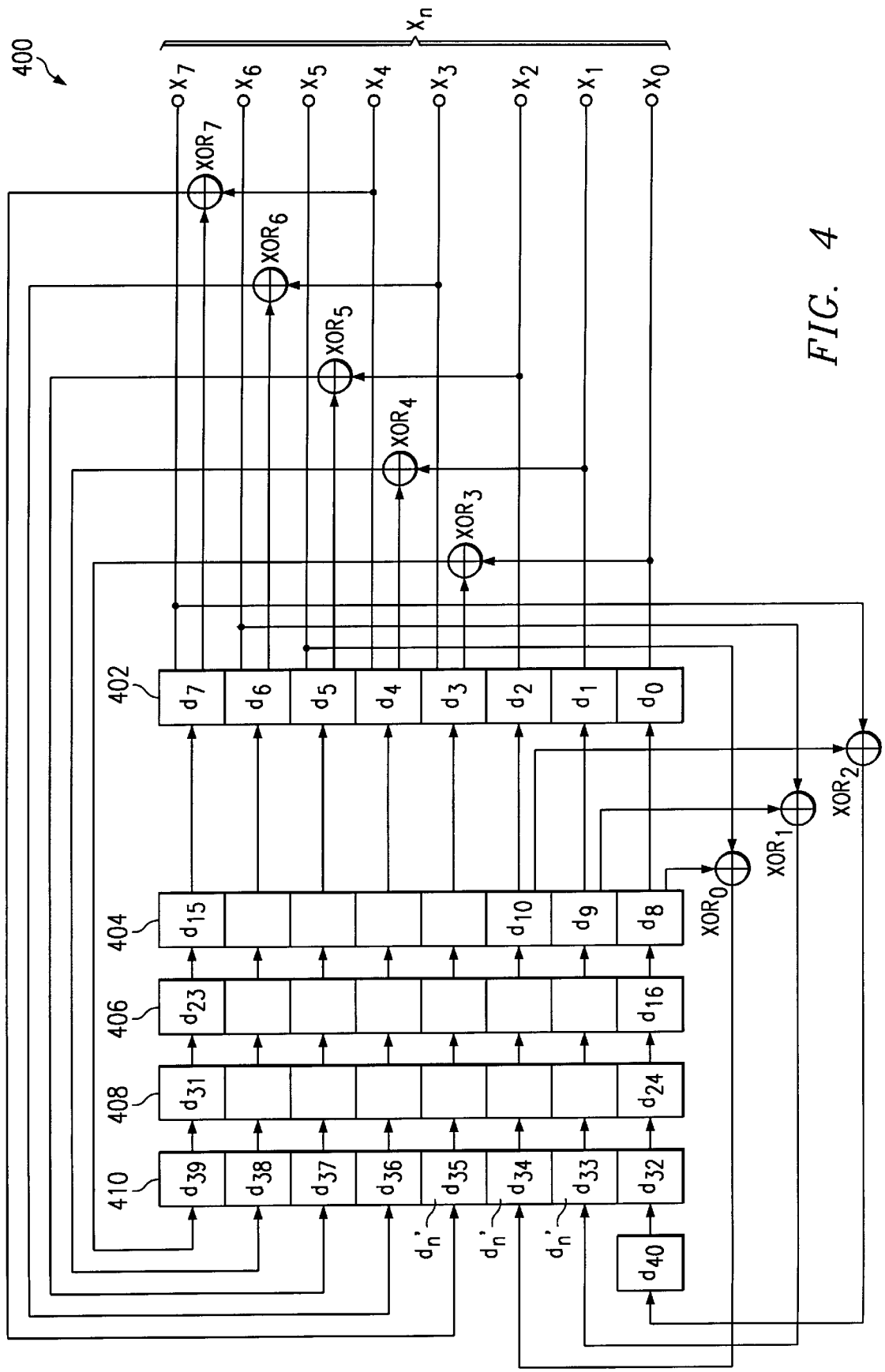
FIG. 4 illustrates a 41-stage 8-bit parallel implementation of an M-sequence structure according to the preferred embodiment.

In order to meet the high-speed and low-power requirements simultaneously, the serial shift register is converted into an equivalent parallel shift register structure that produces the identical bit stream as an output. Referring now to FIG. 4, there is illustrated an 8-bit parallel M-sequence register implementation 400 of the linear feedback shift register of FIG. 1. In order to realize the 8-bit parallel operation, eight linear combining elements $XOR_n$ (e.g., XOR circuits) are used to combine the outputs substantially simultaneously, and input the results of the combining process into selected delay elements clt of the register 400. The process begins by loading all delay elements $d_n'$ with an initial value to begin the decoding of all signals received. This may be performed by a memory (e.g., RAM, or non-volatile memory) which simultaneously loads a value into each delay element in a single clock period. One needs to ensure that all delay elements are not simultaneously loaded with a zero value, as this will prevent the code generator from operating. Since the linear combing process is performed with linear combining elements $XOR_n$, combining is a summing process according to modulo-2 criteria. Summing zeros will never yield a result other than a zero, and prevents the M-sequence generator from producing anything other than zeroes. Additionally, the degree of parallelism (8-bit, 16-bit, etc.) must not be divisible into the total number of delay elements $d_n'$ used in the shift register. For example, in FIG. 4, the length of the shift register is 41 (i.e. 41 delay elements) and the degree of parallelism is 8 (for an 8-bit implementation), which 41 is not divisible by 8.

Referring further to FIG. 4, after the delay elements are loaded with the desired initial values, the code generation process begins. Note that the 41-stage delay element register 400, in this particular embodiment, is grouped into five 8-stage delay element blocks (402, 404, 406, 408, and 410) plus a single delay element $d_{40}$. The first block 402 consists of delay elements $d_0$–$d_7$, the second block 404 consists of delay elements $d_8$–$d_{15}$, the third block 406 consists of delay elements $d_{16}$–$d_{23}$, the fourth block 408 consists of delay elements $d_{24}$–$d_{31}$, and the fifth block 410 consists of delay elements $d_{32}$–$d_{39}$. The last delay element $d_{40}$ outputs it value into delay element $d_{32}$. Additionally, eight linear combining elements $XOR_0$–$XOR_7$ are used to logically sum the contents of the output delay elements $d_0$–$d_7$ with the values contained in other delay elements. For example, $XOR_0$ combines the contents of delay element $d_5$ with the contents of delay element $d_8$ and presents the result to delay element $d_{34}$, $XOR_1$ combines the contents of delay element $d_6$ with the contents of delay element $d_9$ and presents the result to delay element $d_{33}$, $XOR_2$ combines the contents of delay element $d_7$ with the contents of delay element $d_{10}$ and presents the result to delay element $d_{40}$, $XOR_3$ combines the contents of delay element $d_0$ with the contents of delay element $d_3$ and presents the result to delay element $d_{39}$, $XOR_4$ combines the contents of delay element $d_1$ with the contents of delay element $d_4$ and presents the result to delay element $d_{38}$, $XOR_5$ combines the contents of delay element $d_2$ with the contents of delay element $d_5$ and presents the result to delay element $d_{37}$, $XOR_6$ combines the contents of delay element $d_3$ with the contents of delay element $d_6$ and presents the result to delay element $d_{36}$, and $XOR_7$ combines the contents of delay element $d_4$ with the contents of delay element $d_7$ and presents the result to delay element $d_{35}$. In this particular 8-bit parallel implementation, eight values $X_0$–$X_7$ are presented at the output $X_n$ with each clock cycle (output $X_n$ is comprised of individual outputs $X_0$–$X_7$, the respective outputs of delay elements $d_0$–$d_7$). Therefore in terms of the number of clock cycles to provide an equivalent 8-bit output, the serial implementation of FIG. 1 requires eight clock cycles, whereas the parallel implementation requires only one.

Figure 5A:
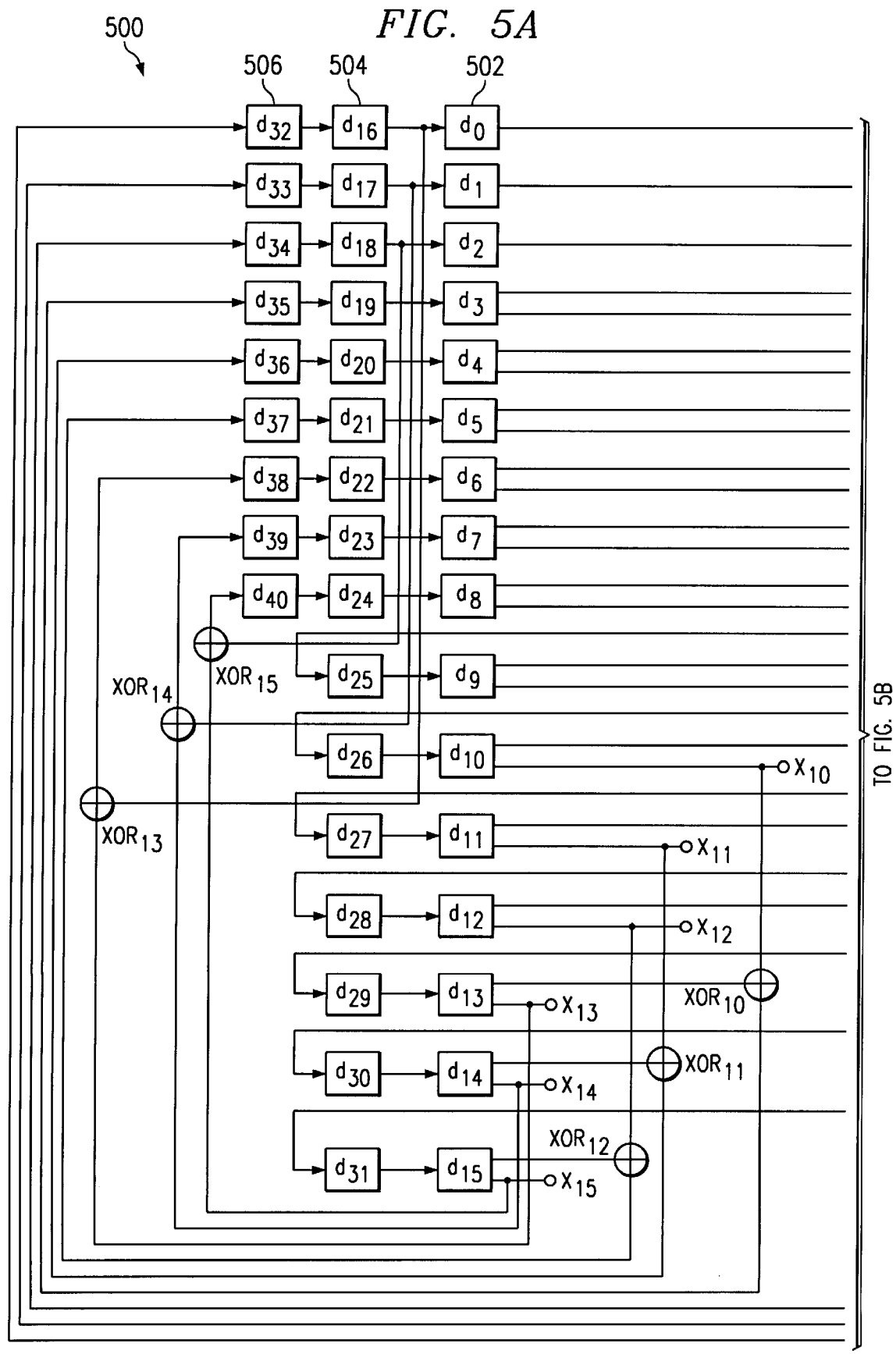
FIG. 5 illustrates a 41-stage 16-bit parallel implementation of an M-sequence structure according to the preferred embodiment.
Figure 5B:
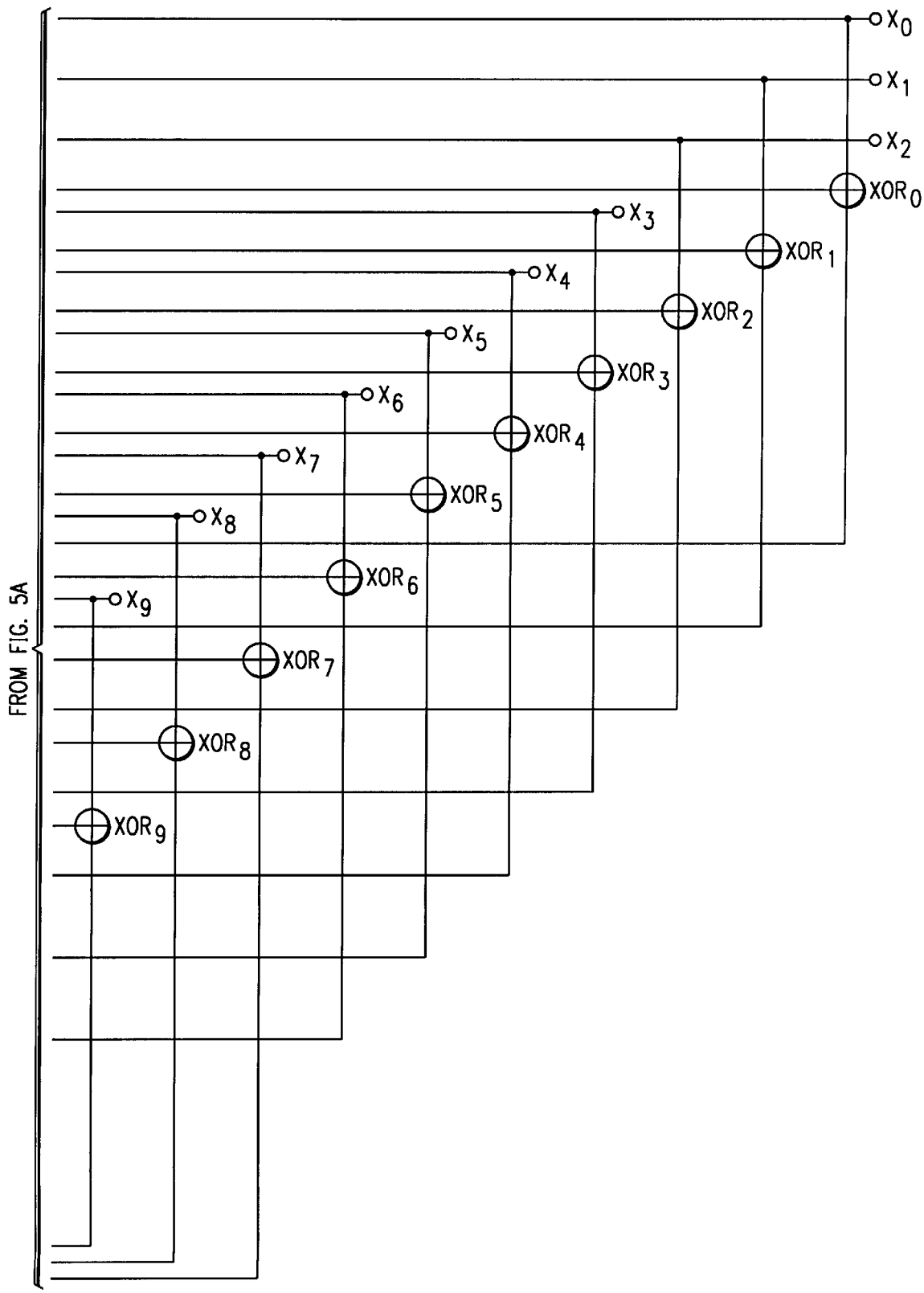

Referring now to FIGS. 5a and 5b, there is illustrated a 16-bit parallel implementation of a conventional 41-stage serial M-sequence generator of FIG. 2. The 16-bit circuit 500 comprises two 16-stage blocks (502 and 504) and one block 506 for the remaining stages. The first block contains delay elements $d_0$–$d_{15}$, the second block contains delay elements $d_{16}$–$d_{31}$, and the remaining block contains delay elements $d_{32}$–$d_{40}$. The sixteen outputs for the 16-bit circuit 500 are also the outputs of delay elements $d_0$–$d_{15}$. The inputs to the delay elements $d_0$–$d_{15}$ are connected to receive the respective outputs of delay elements $d_{16}$–$d_{31}$. The inputs to delay elements $d_{16}$–$d_{24}$ are connected to receive the respective outputs of delay elements $d_{32}$–$d_{40}$. Finally, the inputs to delay elements $d_{25}$–$d_{40}$ are configured to receive the results at the output of a number of linear combining elements. In this particular embodiment, 16 linear combining elements (e.g., $XOR_0$-$XOR_{15}$) are used to perform the combining function of various delay elements. Element $XOR_0$ combines the contents of delay element $d_0$ with the contents of delay element $d_3$ and presents the result to delay element $d_{25}$, element $XOR_1$ combines the contents of delay element $d_1$ with the contents of delay element $d_4$ and presents the result to delay element $d_{26}$, element $XOR_2$ combines the contents of delay element $d_2$ with the contents of delay element $d_5$ and presents the result to delay element $d_{27}$, element $XOR_3$ combines the contents of delay element $d_3$ with the contents of delay element $d_6$ and presents the result to delay element $d_{28}$, element $XOR_4$ combines the contents of delay element $d_4$ with the contents of delay element $d_7$ and presents the result to delay element $d_{29}$, element $XOR_5$ combines the contents of delay element $d_5$ with the contents of delay element $d_8$ and presents the result to delay element $d_{30}$, element $XOR_6$ combines the contents of delay element $d_6$ with the contents of delay element $d_9$ and presents the result to delay element $d_{31}$, element $XOR_7$ combines the contents of delay element $d_7$ with the contents of delay element $d_{10}$ and presents the result to delay element $d_{32}$, element $XOR_8$ combines the contents of delay element $d_8$ with the contents of delay element $d_{11}$ and presents the result to delay element $d_{33}$, element $XOR_9$ combines the contents of delay element $d_9$ with the contents of delay element $d_{12}$ and presents the result to delay element $d_{34}$, element $XOR_{10}$ combines the contents of delay element $d_{10}$ with the contents of delay element $d_{13}$ and presents the result to delay element $d_{35}$, element $XOR_{11}$ combines the contents of delay element $d_{11}$ with the contents of delay element $d_{14}$ and presents the result to delay element $d_{36}$, element $XOR_{12}$ combines the contents of delay element $d_{12}$ with the contents of delay element $d_{15}$ and presents the result to delay element $d_{37}$, element $XOR_{13}$ combines the contents of delay element $d_{13}$ with the contents of delay element $d_{16}$ and presents the result to delay element $d_{38}$, element $XOR_{14}$ combines the contents of delay element $d_{14}$ with the contents of delay element $d_{17}$ and presents the result to delay element $d_{39}$, and element $XOR_{15}$ combines the contents of delay element $d_{15}$ with the contents of delay element $d_{18}$ and presents the result to delay element $d_{40}$.

Referring now to FIGS. 6a, 6b, and 6c, there is illustrated a set of matrices for determining the delay elements which need to be combined and fed back to the input in order to obtain an equivalent parallel structure with the identical output of the serial code generator. When a polynomial representation corresponding to the shift-register code generator is used, it can be shown that value of the new register cell, when the whole register is shifted by a number of clocks, can be given as an XOR addition of the initial register cell values with appropriate coefficients of 1 or 0. Because the code generator does not have any external input, all the future code output is determined by the present values contained in the register cells. Thus considering a 9-clock shift for the register, the cell-to-cell addition relationship can be derived by considering generation of the output code nine clocks ahead. Depending on the code generator and number of shifts, the structure of a parallel code generator may become interweaved.

Referring further to FIGS. 6a, 6b, and 6c, the code generation process can also be shown by using a companion matrix I. This matrix I is multiplied (1+1=0 in binary math) with the present shift register contents and yields the contents of the register for the next clock pulse. For example, the first next shift register state=I×(present shift register contents), the second next shift register state=I×I×(present shift register contents), . . . , the eighth next shift register state=$I^8$×(present shift register contents), etc. The register values are multiplied from the right as a vector. When multiplying matrix I eight times, a matrix $I^8$ is produced which provides the information needed for implementing the 8-bit parallel code shifter. In this example, register cells $d_{33}$–$d_{40}$ are updated by adding two cell values, but the rest of the cells are merely shifted from respective register cells. The matrix $I^{16}$ is the result of matrix I multiplied by itself 16 times. The matrix I is determined by the structure of the code generator alone (e.g. tap locations, number of stages or cells, phasing, clock rate, etc.), and a general serial code generator can be converted to an N-bit parallelized M-sequence structure by deriving the matrix I, multiplying the matrix I by a desired number of times (e.g., N times), multiplying the resultant matrix $I^N$ by the present shift register contents, and implementing the resulting connections. The connections may become interweaved depending on the code generator and order of the parallelism.

Figure 7:
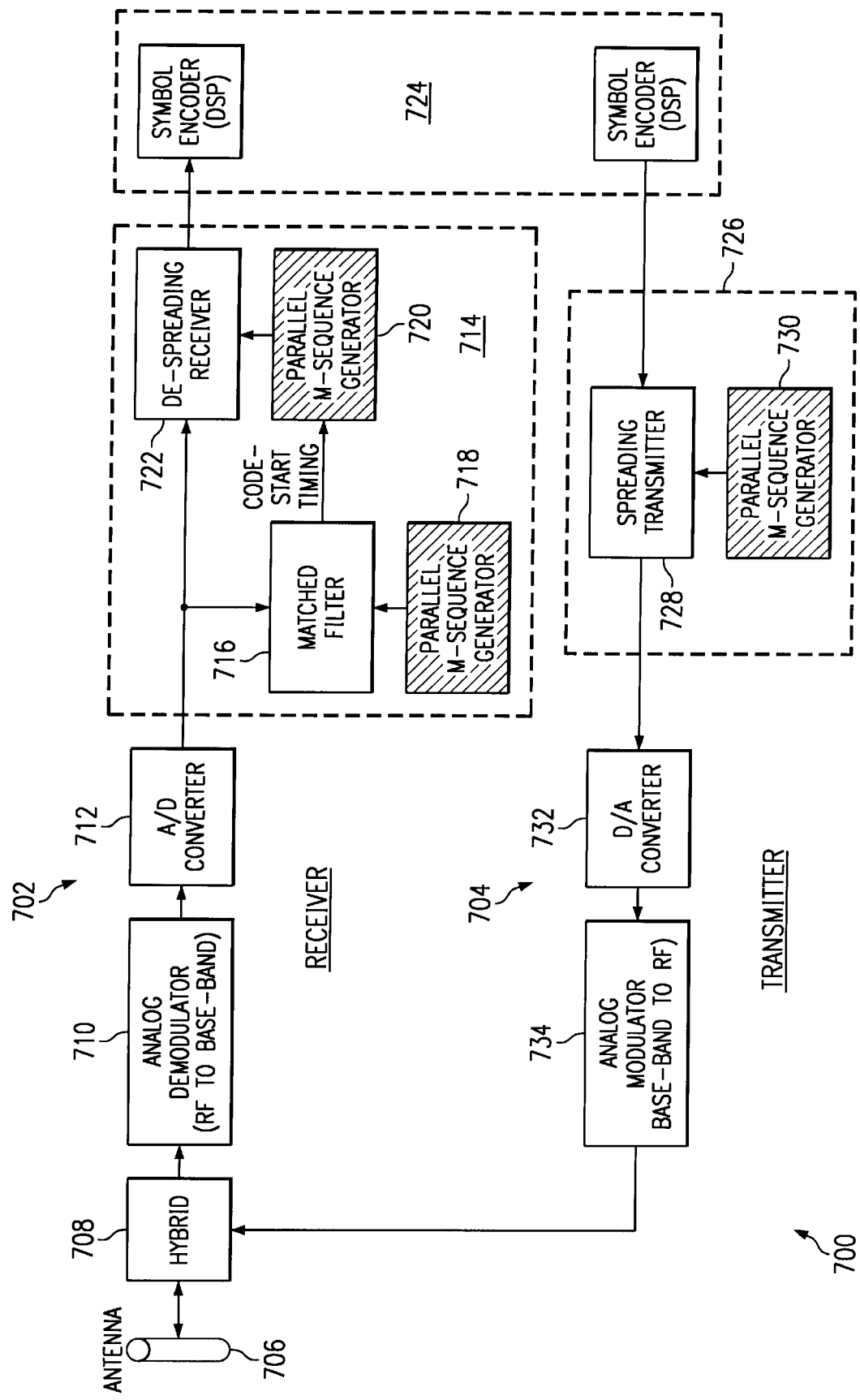
FIG. 7 illustrates a spread spectrum system communication using the parallel M-sequence generator structure.

FIG. 7 illustrates a spread spectrum system using a parallel M-sequence structure. Spread spectrum communication requires that the transmitting device and the receiving device spreading waveforms be synchronized. If the two waveforms are out of synchronization by as much as one chip, insufficient signal energy will reach the receiver demodulator for reliable data detection. The task of achieving (code acquisition) and maintaining code synchronization (code tracking) is usually delegated to the receiver. The system 700 comprises receiver circuitry 702 and transmitter circuitry 704. The receiver system 702 receives a signal through an antenna 706 into a hybrid circuit 708, which is operable to provide the interface between the receiver circuitry 702 and transmitter circuitry 704, and the antenna 706. The incoming signal is typically modulated with IF and RF carriers and therefore, is demodulated through an analog demodulator circuit 710 to strip off the IF and RF carrier signals (e.g., 21.4 MHz and 950 MHz, respectively) to reveal the base-band component. The analog signal is then digitized with an A/D converter circuit 712 prior to commencing the de-spreading operation. The de-spreading section 714 comprises a number of circuits used for code acquisition. Initial synchronization begins by inputting the now digital signal received from the converter 712 into a matched filter 716 to detect the received signal. The encoded incoming signal is first aligned with the locally generated sequence code produced from a parallel M-sequence generator 718 with identical settings (taps, length, delay element contents, clock rate, etc.) of the generator of the transmitting device, and connected to the matched filter 716. When peak correlation exists between the incoming signal and the local code, the codes are presumably aligned with each other. The matched filter 716 is designed to output a pulse when a particular code sequence is received. When this pulse is sensed, the receiver code generator 720 is started using an initial condition corresponding to the received code phase, and synchronization is complete. The de-spreading process then begins with a de-spreading receiver 722 using the local code to de-spread the information signal. The signal is then fed to Digital Signal Processing (DSP) circuitry 724 for decoding to audible information for the listener. When the listener responds, voice signals are processed through the transmitter circuitry 704. The voice signals are encoded with DSP circuitry 724 and passed to the spreading section 726. The spreading section comprises a spreading transmitter 728 which receives the local code from a parallel M-sequence generator 730 for spreading the voice signals. The spread signal is then passed to a D/A converter 732 for conversion to an analog signal prior to modulation with a modulator circuit 734. Mixing with the RF carrier causes the RF signal to be replaced with a very wide bandwidth signal which appears as noise in the frequency domain. The RF modulated signal is then passed back through the hybrid interface circuit 708 for transmission through the antenna 706 over various propagation media (e.g., satellite communications, repeaters, or direct communications) to the receiving party.

It should be noted that the disclosed method is applicable to higher order systems, for example, 16-bit, 32-bit, etc. Appropriate selection for the feedback inputs and outputs is all that is required. In the case of a 16-bit implementation, the parallel implementation is 16 times more advantageous in terms of speed. The increase in the number of XOR circuits has a minimal impact on the power consumption compared with the number flip-flops used, since the major power consumption in CMOS technology comes from the transient short-circuit latch current between the NMOS and PMOS transistors in the flip-flop delay elements.

Although the preferred embodiment has been described in detail, it should be understood that various changes, substitutions and alterations can be made therein without departing from the spirit and scope of the invention as defined by the appended claims.

What is claimed is:

1. A method for generating a maximal length sequence of data, comprising the steps of:
   providing a plurality of blocks of shift registers, each of the blocks having a length N;
   connecting the blocks in a parallel configuration in an order from an input block to an output block, wherein each of the outputs of the shift registers in a proceeding one of the blocks is input to the input of corresponding ones of the shift registers in the adjacent one of the blocks with the last of the blocks providing an N-bit output word, wherein the plurality of blocks further comprises a remainder block having a length less than N and comprising the first of the blocks in the parallel configuration; and
   interconnecting the outputs of select ones of the shift registers in the blocks through a feedback operator to inputs of select ones of the shift registers in the blocks in accordance with a maximal length sequence algorithm, wherein an initial sequence of data stored in the blocks of shift registers is shifted through the blocks of shift registers in N-bit increments to realize a maximal length sequence defined by the algorithm.

2. The method of claim 1, wherein in the step of interconnecting, the output of the feedback operator is input to at least a most significant bit of the remainder block.

3. The method of claim 1, wherein the step of interconnecting logically combines at least two of the shift register outputs with a predetermined logic operation to provide one or more of the outputs.

4. The method of claim 3, wherein the step of interconnecting performs a modulo-2 operation on select ones of the inputs thereto.

5. The method of claim 4, wherein the step of interconnecting includes the step of exclusive-ORing with exclusive-OR gates received associated ones of the inputs to provide one of the outputs.

6. The method of claim 5, wherein a plurality of ORing steps are performed and the number of exclusive-OR gates equals the number of bits in the output word.

7. The method of claim 3, wherein the step of interconnecting logically combines the output of each of the shift registers of the output block to provide one or more of the outputs.

8. A maximal length sequence generator, comprising:
   a plurality of blocks of shift registers, each of said blocks having a length N;
   a connection network for connecting said blocks in a parallel configuration in an order from an input block to an output block, wherein each of the outputs of said shift registers in a proceeding one of said blocks is input to the input of corresponding ones of said shift registers in the adjacent one of said blocks, with the last of said blocks providing an N-bit output word, wherein said plurality of blocks further comprises a remainder block having a length less than N and comprising the first of said blocks in said parallel configuration; and
   a feedback logic network for interconnecting the outputs of select ones of said shift registers in said blocks through a feedback operator to inputs of select ones of said shift registers in said blocks in accordance with a maximal length sequence algorithm, wherein an initial sequence of data stored in said blocks of shift registers is shifted through said blocks of shift registers in N-bit increments to realize a maximal length sequence defined by said algorithm.

9. The generator of claim 8, wherein the output of said feedback logic network is input to at least a most significant bit of said remainder block.

10. The generator of claim 8, wherein said feedback logic network logically combines at least two said shift register outputs with a predetermined logic operation to provide one or more of the outputs.

11. The generator of claim 10, wherein said feedback logic network performs a modulo-2 operation on selected ones of said inputs thereto.

12. The generator of claim 11, wherein said feedback logic network comprises exclusive ORing with exclusive-OR gates received associated ones of said inputs to provide one of said outputs.

13. The generator of claim 12, wherein the number of exclusive-OR gates equals the number of bits in said output word.

14. The generator of claim 10, wherein said feedback logic network logically combines the output of each of said shift registers of said output block to provide one or more of the outputs.

15. A communication system, comprising:
   a transmitting section for sending a signal, comprising
      a mixing circuit for mixing the signal with carrier frequencies,
      a signal transmission device, and
      a maximal sequence generator; and
   a receiving section for receiving the signal, comprising
      a mixing circuit for mixing the signal with carrier frequencies,
      a signal reception device, and
      a maximal sequence generator, wherein the maximal sequence generator of the transmitting section and the receiving section comprising
      a plurality of blocks of shift registers, each of said blocks having a length N;
      a connection network for connecting said blocks in a parallel configuration in an order from an input block to an output block, wherein each of the outputs of said shift registers in a proceeding one of said blocks is input to the input of corresponding ones of said shift registers in the adjacent one of said blocks, with the last of said blocks providing an N-bit output word, wherein said plurality of blocks further comprises a remainder block having a length less than N and comprising the first of said blocks in said parallel configuration; and
      a feedback logic network for interconnecting the outputs of select ones of said shift registers in said blocks through a feedback operator to inputs of select ones of said shift registers in said blocks in accordance with a maximal length sequence algorithm, wherein an initial sequence of data stored in said blocks of shift registers is shifted through said blocks of shift registers in N-bit increments to realize maximal length sequence defined by said algorithm.

16. The system of claim 15, wherein the output of said feedback logic network is input to at least a most significant bit of said remainder block.

17. The system of claim 15, wherein said feedback logic network logically combines at least two said shift register outputs with a predetermined logic operation to provide one or more of the outputs.

18. The system of claim 17, wherein said feedback logic network performs a modulo-2 operation on selected ones of said inputs thereto.

19. The system of claim 18, wherein said feedback logic network comprises exclusive-ORing with exclusive-OR gates received associated ones of said inputs to provide one of said outputs.

20. The system of claim 19, wherein the number of exclusive-OR gates equals the number of bits in said output word.

21. The system of claim 17, wherein said feedback logic network logically combines the output of each of said shift registers of said output block to provide one or more of the outputs.

* * * * *